(12) United States Patent
Zhao et al.

(10) Patent No.: US 10,734,689 B2
(45) Date of Patent: Aug. 4, 2020

(54) METHOD AND SYSTEM FOR RECONSTRUCTING COMPLETE CHARGING-DISCHARGING DATA BASED ON PARTIAL CHARGING-DISCHARGING DATA OF BATTERY

(71) Applicant: Shenzhen HYNN Technologies Co., Ltd., Shenzhen, Guangdong (CN)

(72) Inventors: Shaohua Zhao, Guangdong (CN); Shoumo Wang, Guangdong (CN); Jinhui Liu, Guangdong (CN)

(73) Assignee: Shenzhen HYNN Technologies Co., Ltd., Shenzhen (CN)

( * ) Notice: Subject to any disclaimer, the term of this patent is extended or adjusted under 35 U.S.C. 154(b) by 349 days.

(21) Appl. No.: 15/847,959

(22) Filed: Dec. 20, 2017

(65) Prior Publication Data

US 2019/0154760 A1    May 23, 2019

Related U.S. Application Data

(63) Continuation of application No. PCT/CN2017/111651, filed on Nov. 17, 2017.

(51) Int. Cl.
*H01M 10/44* (2006.01)
*H01M 10/48* (2006.01)
(Continued)

(52) U.S. Cl.
CPC ........... *H01M 10/48* (2013.01); *H01M 10/42* (2013.01); *H01M 10/446* (2013.01); *G06F 17/13* (2013.01);
(Continued)

(58) Field of Classification Search
CPC ....... H01M 10/48; G06F 17/142; G06F 17/13
See application file for complete search history.

(56) References Cited

U.S. PATENT DOCUMENTS

| 4,782,281 A | 11/1988 | Williamson |
| 2008/0094031 A1* | 4/2008 | Singh ............... H01M 10/48 320/132 |

(Continued)

FOREIGN PATENT DOCUMENTS

| CN | 1151020 A | 6/1997 |
| CN | 1508901 A | 6/2004 |

(Continued)

OTHER PUBLICATIONS

Du Sauer, Batteries | Charge-Discharge Curves, 2009, Elsevier B.V., pp. 443-451 (Year: 2009).*

(Continued)

*Primary Examiner* — Mischita L Henson (57) ABSTRACT

Disclosed is a method for reconstructing complete charging-discharging data based on partial charging-discharging data of a battery. The method includes following steps: obtaining a partial charging-discharging measured data curve, including multiple pieces of discrete sampling-point data, of the battery; determining a starting point, relative to a preset global center reference data curve, of the partial charging-discharging measured data curve; and determining an approximation curve by means of linear reconstruction or least square reconstruction, and supplementing a charging-discharging measured data curve of a remaining part other than the partial charging-discharging measured data curve according to the approximation curve and the starting point, relative to the preset global center reference data curve, of the partial charging-discharging measured data curve, to reconstruct a complete charging-discharging measured data curve. In the method, the complete charging-discharging data curve can be reconstructed with high precision by using the partial charging-discharging measured data.

9 Claims, 5 Drawing Sheets

(51) Int. Cl.
*H01M 10/42* (2006.01)
*G06F 17/13* (2006.01)
*G06F 17/14* (2006.01)
*H01M 10/052* (2010.01)

(52) U.S. Cl.
CPC ......... *G06F 17/142* (2013.01); *H01M 10/052* (2013.01)

(56) References Cited

U.S. PATENT DOCUMENTS

| | | | |
|---|---|---|---|
| 2014/0180514 A1* | 6/2014 | Becker | B60W 20/00 701/22 |
| 2016/0211679 A1* | 7/2016 | Rabbers | H01M 16/00 |

FOREIGN PATENT DOCUMENTS

| | | |
|---|---|---|
| CN | 102854469 A | 1/2013 |
| CN | 103135056 A | 6/2013 |
| CN | 104502859 A | 4/2015 |
| CN | 105388422 A | 3/2016 |
| CN | 106093517 A | 11/2016 |
| CN | 106093796 A | 11/2016 |
| CN | 106475329 A | 3/2017 |
| CN | 106569143 A | 4/2017 |
| CN | 106772113 A | 5/2017 |
| CN | 107329094 A | 11/2017 |
| JP | 2000116014 A | 4/2000 |
| WO | 8600418 A1 | 1/1986 |

OTHER PUBLICATIONS

Elie Riviere et al., Innovative Incremental Capacity Analysis Implementation for C/LiFePO4 Cell State-of-Health Estimation in Electrical Vehicles, Apr. 2019, Batteries, 4, 37, pp. 1-13; ; doi:10.3390/batteries5020037 (Year: 2019).*

Hua-Dong Zhou et al., Analyzing and modeling for charging/discharging process of substation battery, China Academic Journal Electronic Publishing House, Mar. 2015, pp. 536-538 and 577, vol. 39, No. 3.

* cited by examiner

METHOD AND SYSTEM FOR RECONSTRUCTING COMPLETE CHARGING-DISCHARGING DATA BASED ON PARTIAL CHARGING-DISCHARGING DATA OF BATTERY

CROSS REFERENCE TO RELATED APPLICATION

This application is a continuation application of PCT/CN2017/111651, filed on Nov. 17, 2017. The contents of the above-mentioned application are all hereby incorporated by reference.

BACKGROUND

Field of the Invention

The present invention relates to production and testing of a secondary battery, and in particular, to a method and system for reconstructing complete charging-discharging data based on partial charging-discharging data of a secondary battery.

Related Arts

During production and testing of secondary batteries such as lithium batteries, for example, in stages such as capacity grading, multiple charging-discharging tests need to be performed on each battery cell to obtain complete charging-discharging data. For example, before the capacity grading process, formation and aging processes are first performed on the lithium battery, and a lithium battery cell still has a partial electrical quantity. In the capacity grading process, the lithium battery cell needs to be charged first at a constant current and then a constant voltage until the battery cell is fully charged to a state of charge of 100%. Subsequently, the battery is discharged at a constant current to a cutoff voltage, to obtain a complete discharging data curve. After standing for a period of time, the battery is charged at a constant current and a constant voltage until the state of charge of 100%, and a complete charging data curve is obtained. Usually, to meet delivery requirements, the lithium battery cell further needs to be partially discharged until the state of charge meets the delivery requirements. Therefore, at least 1.5 charging-discharging cycles are needed in a common capacity grading process. In some capacity grading processes, multiple charging-discharging cycles at different charging-discharging currents are even required. The complete charging-discharging data is used for charging capacity estimation, discharging capacity estimation, a constant current/constant voltage ratio, capacity grading, direct current internal resistance (DCIR) estimation and so on. Usually, a complete charging-discharging cycle takes approximately two to three hours, which depends on a production process, for example, static duration, of a lithium battery.

SUMMARY

To overcome the disadvantages of the prior art, a main objective of the present disclosure is to provide a method and system for reconstructing complete charging-discharging data based on partial charging-discharging data of a secondary battery, where a complete charging-discharging data curve can be reconstructed by using partial charging-discharging measured data, and time of processes, such as capacity grading, is reduced, thereby improving production efficiency.

To achieve the foregoing objective, the following technical solutions are used in the present invention:

A method for reconstructing complete charging-discharging data based on partial charging-discharging data of a battery is provided, where the battery is especially a lithium battery, including the following steps:

A. obtaining a partial charging-discharging measured data curve, including multiple pieces of discrete sampling-point data, of the battery;

B. determining a starting point, relative to a preset global center reference data curve, of the partial charging-discharging measured data curve; and C. determining, by using the partial charging-discharging measured data curve and multiple preset grade center reference data curves, an approximation curve by means of linear reconstruction or least square reconstruction, and supplementing a charging-discharging measured data curve of a remaining part other than the partial charging-discharging measured data curve according to the approximation curve and the starting point, relative to the preset global center reference data curve, of the partial charging-discharging measured data curve, to reconstruct a complete charging-discharging measured data curve.

Further, step A includes performing preprocessing on the partial charging-discharging measured data curve, where the preprocessing includes the following steps:

A1. performing a fast Fourier transform (FFT) on the multiple pieces of discrete sampling-point data, to transform time-domain data to frequency-domain data;

A2. performing windowing and smooth filtering on the frequency-domain data;

A3. performing a zero-filling interpolation on the filtered frequency-domain data to make a sampling rate of the frequency-domain data consistent with a data sampling rate of the global center reference data curve and a data sampling rate of the grade center reference data curve; and A4. transforming the frequency-domain data on which the smooth filtering and the interpolation have been performed to time-domain data.

Further, in step B, the starting point, relative to the global center reference data curve, of the partial charging-discharging measured data curve is determined by searching, in a preset sliding window, for a minimum absolute value of a difference between the partial charging-discharging measured data curve and the global center reference data curve.

Further, step B includes:

B1. obtaining a segment of data of a set length by using a set point on the global center reference data curve as a starting point corresponding to a sampling sequence number w, calculating a difference by subtracting corresponding measured data on the partial charging-discharging measured data curve from the segment of data, accumulating the differences after the subtraction, and calculating an absolute value of an accumulated value, where w is initialized to 1;

B2. comparing the absolute value of the accumulated value calculated in step B1 with a minimum difference e_min that is initially set to a maximum number, and if the absolute value is less than e_min, update e_min with the absolute value of the accumulated value calculated in step B1; and B3. updating the starting point, increasing w by 1, and if w is greater than a size of the sliding window, ending the process; otherwise, returning to step B1.

Further, step C includes the following steps:

C11. matching the partial charging-discharging measured data curve with each of the multiple grade center reference data curves separately, to determine a grade center reference data curve having a minimum difference from the partial charging-discharging measured data curve; and C12. using the grade center reference data curve determined in the step C11 as the approximation curve, and supplementing the charging-discharging measured data curve of the remaining part after translating the approximation curve according to the starting point, to reconstruct the complete charging-discharging measured data curve.

Further, step C includes the following steps:

C21. approximating the partial charging-discharging measured data curve by using the multiple grade center reference data curves, to determine an optimal coefficient that minimizes a quadratic sum of an approximate error; and C22. constructing the approximation curve by using the multiple grade center reference data curves according to the optimal coefficient, and supplementing the charging-discharging measured data curve of the remaining part after translating the approximation curve, to reconstruct the complete charging-discharging measured data curve.

Further, in step C21, the multiple grade center reference data curves are set to be L curves, and each grade center reference data curve is set to have N pieces of discrete sampling-point data;

partial charging-discharging measured data including the N pieces of discrete sampling-point data is indicated by a vector:

$$\hat{s}_N = [\hat{s}(1) \ldots \hat{s}(N)]^T;$$

M pieces of complete charging-discharging data of a first grade center reference data curve are indicated by a vector:

$$r_1 = [r_1(1) \ldots r_1(N-1) r_1(N) \ldots r_1(M)]^T;$$

an L×M matrix formed by L pieces of grade reference data is:

$$R_M = \begin{bmatrix} r_1(1) & \ldots & r_1(M) \\ \ldots & \ldots & \ldots \\ r_L(1) & \ldots & r_L(M) \end{bmatrix};$$

an L×N matrix formed by respectively using $p_{std}$ as a starting point and data of a length of N in the L pieces of grade reference data is:

$$R_N = \begin{bmatrix} r_1(p_{std}) & \ldots & r_1(N + p_{std} - 1) \\ \ldots & \ldots & \ldots \\ r_L(p_{std}) & \ldots & r_L(N + p_{std} - 1) \end{bmatrix};$$

an undetermined coefficient vector is set to $h = [h(1) \ldots h(L)]^T$, and least square approximation is performed by using the following formula:

$$\min_h \varepsilon_{LS} = \|R_N^T h - \hat{s}_N\|^2;$$

the optimal coefficient $h_{LS}$ is solved as:

$$h_{LS} = (R_N R_N^T)^{-1} R_N \hat{s}_N;$$

after the optimal coefficient is determined, the approximation curve reconstructed by using L grade center reference data curves is:

$$\hat{s}_{apro} = R_M^T h_{LS}.$$

Further, the global center reference data curve and the multiple grade center reference data curves are preset according to a material and a production process of the battery.

A computer-readable storage medium is provided, storing a computer program is stored on the computer-readable storage medium, where when the computer program is executed by a processor, the method for reconstructing complete charging-discharging data based on partial charging-discharging data of a battery is implemented.

A system for reconstructing complete charging-discharging data based on partial charging-discharging data of a battery is provided, including:

a processor; and a memory, configured to store an executable instruction of the processor, where the processor is configured to execute the method for reconstructing complete charging-discharging data based on partial charging-discharging data of a battery by executing the executable instruction.

Beneficial effects of the present disclosure:

To reduce time of processes such as capacity grading and DCIR testing, and improve production efficiency, the present disclosure provides a method for reconstructing complete charging-discharging data based on partial charging-discharging data. The method of the present disclosure is based on a preset reference data curve, and a complete charging-discharging data curve can be reconstructed with high precision by only using partial charging-discharging measured data. When the method of the present disclosure is applied to a capacity grading process, it is only needed to charge a lithium battery cell having a partial electrical quantity to a full state of charge and then, partially discharge the lithium battery cell to meet a delivery requirement. That is, the complete charging-discharging data curve can be reconstructed by using partial charging data and partial discharging data, to complete subsequent charging-discharging capacity estimation and battery grading. In this case, an intermediate complete charging-discharging cycle is omitted, thereby reducing the time by more than 50% and greatly improving the production efficiency.

The features and technical advantages of the present disclosure are quite widely described above, so that detailed description about the present disclosure can be better understood. Other features and advantages of the present disclosure are described below.

DETAILED DESCRIPTION

The present disclosure is further described below in detail with reference to embodiments and the accompanying drawings. It should be emphasized that, the following description is merely exemplary and is not intended to limit the scope and application of the present invention. It should be understood by persons skilled in the art that the disclosed concept and specific embodiments may be easily used as bases for modifying or designing other structures, so as to achieve an objective the same as that of the present disclosure. It should also be learned by persons skilled in the art that such equivalent constructions do not deviate from the spirit and scope of the present invention. Structures, operation methods, further objectives, and advantages of the novel features that are considered to be characteristics of the present disclosure can be better understood from the following description with reference to the accompanying drawings. However, it should be deeply understood that each feature is provided merely for description and explanation, and is not intended to limit the definition of the present invention.

Figure 1:
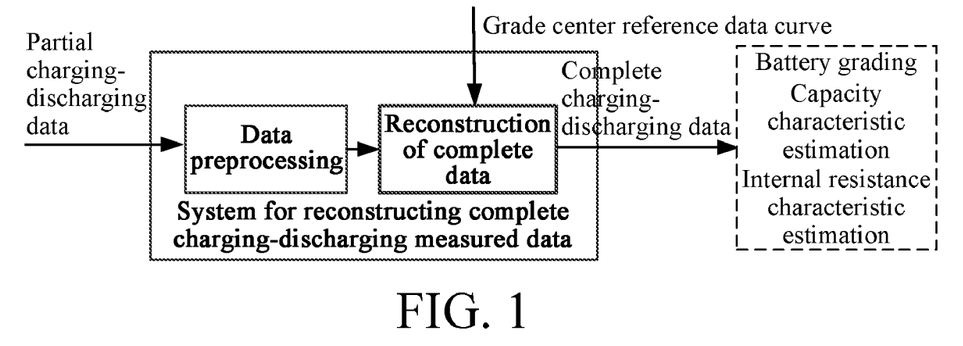
FIG. 1 is a principle diagram of reconstructing complete charging-discharging data based on partial charging-discharging data of a battery according to an embodiment of the present disclosure.

Referring to FIG. 1, in an embodiment, a method for reconstructing complete charging-discharging data based on partial charging-discharging data of a battery is provided, where the battery is especially a lithium battery, includes the following steps:

Step A. Obtain a partial charging-discharging measured data curve, including multiple pieces of discrete sampling-point data, of the battery.

Step B. Determine a starting point, relative to a preset global center reference data curve, of the partial charging-discharging measured data curve.

Step C. Determine, by using the partial charging-discharging measured data curve and multiple preset grade center reference data curves, an approximation curve by means of linear reconstruction or least square reconstruction, and supplement a charging-discharging measured data curve of a remaining part other than the partial charging-discharging measured data curve according to the approximation curve and the starting point, relative to the preset global center reference data curve, of the partial charging-discharging measured data curve, to reconstruct a complete charging-discharging measured data curve.

In various embodiments, a partial charging-discharging measured data curve may be, but is not limited to, a constant-current charging voltage-time curve, a constant-current discharging voltage-time curve, a constant-voltage charging current-time curve, a constant-voltage discharging current-time curve, or the like.

Figure 2:
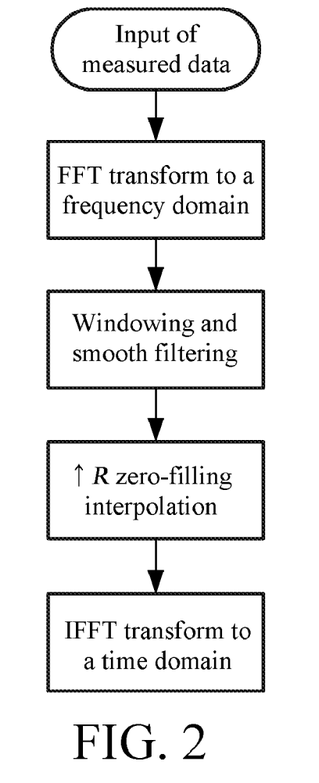
FIG. 2 is a flowchart of data preprocessing according to an embodiment of the present disclosure.

Referring to FIG. 1 and FIG. 2, in a preferred embodiment, step A includes performing preprocessing on the partial charging-discharging measured data curve, where the preprocessing includes the following steps:

Step A1. Perform an FFT on the multiple pieces of discrete sampling-point data, to transform time-domain data to frequency-domain data.

Step A2: Perform windowing and smooth filtering on the frequency-domain data.

Step A3. Perform a zero-filling interpolation on the filtered frequency-domain data to make a sampling rate of the frequency-domain data consistent with a data sampling rate of the global center reference data curve and a data sampling rate of the grade center reference data curve.

Step A4. Transform the frequency-domain data on which the smooth filtering and the interpolation have been performed to time-domain data.

In a preferred embodiment, in step B, the starting point, relative to the global center reference data curve, of the partial charging-discharging measured data curve is determined by searching, in a preset sliding window, for a minimum absolute value of a difference between the partial charging-discharging measured data curve and the global center reference data curve.

In a further preferred embodiment, step B includes:

Step B1. Obtain a segment of data of a set length by using a set point on the global center reference data curve as a starting point corresponding to a sampling sequence number w, calculate a difference by subtracting corresponding measured data on the partial charging-discharging measured data curve from the segment of data, accumulate the differences after the subtraction, and calculate an absolute value of an accumulated value, where w is initialized to 1.

Step B2. Compare the absolute value of the accumulated value calculated in step B1 with a minimum difference e_min that is initially set to a maximum number, and if the absolute value is less than e_min, update e_min with the absolute value of the accumulated value calculated in step B1

Step B3. Update the starting point, increase w by 1, and if w is greater than a size of the sliding window, end the process; otherwise, return to step B1.

In a preferred embodiment, step C includes the following steps:

Step C11. Match the partial charging-discharging measured data curve with each of the multiple grade center reference data curves separately, to determine a grade center reference data curve having a minimum difference from the partial charging-discharging measured data curve.

Step C12. Use the grade center reference data curve determined in the step C11 as the approximation curve, and supplement the charging-discharging measured data curve of the remaining part after translating the approximation curve according to the starting point, to reconstruct the complete charging-discharging measured data curve.

In another preferred embodiment, step C includes the following steps:

Step C21. Approximate the partial charging-discharging measured data curve by using the multiple grade center reference data curves, to determine an optimal coefficient that minimizes a quadratic sum of an approximate error.

Step C22. Construct the approximation curve by using the multiple grade center reference data curves according to the optimal coefficient, and supplement the charging-discharging measured data curve of the remaining part after translating the approximation curve, to reconstruct the complete charging-discharging measured data curve.

In a further preferred embodiment, in step C21, the multiple grade center reference data curves are set to be L curves, and each grade center reference data curve is set to have N pieces of discrete sampling-point data;

partial charging-discharging measured data including the N pieces of discrete sampling-point data is indicated by a vector:

$$\hat{s}_N = [\hat{s}(1) \ldots \hat{s}(N)]^T;$$

M pieces of complete charging-discharging data of a first grade center reference data curve are indicated by a vector:

$$r_1 = [r_1(1) \ldots r_1(N-1) r_1(N) \ldots r_1(M)]^T;$$

an L×M matrix formed by L pieces of grade reference data is:

$$R_M = \begin{bmatrix} r_1(1) & \ldots & r_1(M) \\ \ldots & \ldots & \ldots \\ r_L(1) & \ldots & r_L(M) \end{bmatrix};$$

an L×N matrix formed by respectively using $p_{std}$ as a starting point and data of a length of N in the L pieces of grade reference data is:

$$R_N = \begin{bmatrix} r_1(p_{std}) & \ldots & r_1(N+p_{std}-1) \\ \ldots & \ldots & \ldots \\ r_L(p_{std}) & \ldots & r_L(N+p_{std}-1) \end{bmatrix};$$

an undetermined coefficient vector is set to $h = [h(1) \ldots h(L)]^T$, and least square approximation is performed by using the following formula:

$$\min_h \varepsilon_{LS} = \|R_N^T h - \hat{s}_N\|^2;$$

the optimal coefficient h is solved as $$h_{LS} = (R_N R_N^T)^{-1} R_N \hat{s}_N;$$

after the optimal coefficient is determined, the approximation curve reconstructed by using L grade center reference data curves is:

$$\hat{s}_{apro} = R_M^T h_{LS}.$$

In a preferred embodiment, the global center reference data curve and the multiple grade center reference data curves are preset according to a material and a production process of the battery.

Figure 8:
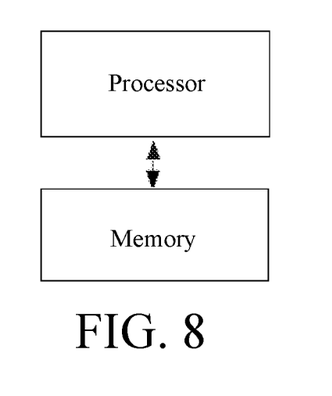
FIG. 8 is a system according to an embodiment of the present disclosure, where a processor is configured to execute a method for reconstructing complete charging-discharging data based on partial charging-discharging data of a battery by executing an executable instruction stored in a memory.

Referring to FIG. 8, in another embodiment, a computer-readable storage medium, such as a memory, is provided, storing a computer program, where when the computer program is executed by a processor, the method for reconstructing complete charging-discharging data based on partial charging-discharging data of a battery according to any one of the foregoing embodiments is implemented.

Referring to FIG. 8, in another embodiment, a system for reconstructing complete charging-discharging data based on partial charging-discharging data of a battery is provided, including:

a processor; and a memory, configured to store an executable instruction of the processor, where the processor is configured to execute the method for reconstructing complete charging-discharging data based on partial charging-discharging data of a battery according to any one of the foregoing embodiments by executing the executable instruction.

To reduce time of processes such as capacity grading, and improve production efficiency, embodiments of the present invention provide a method and system for reconstructing complete charging-discharging data based on partial charging-discharging data. The present invention is based on a preset reference data curve, and a complete charging-discharging data curve can be reconstructed with high precision by only using partial charging-discharging measured data. When the system is applied to a capacity grading process, it is only needed to charge a lithium battery cell having a partial electrical quantity to a full state of charge and then, partially discharge the lithium battery cell to meet a delivery requirement. That is, the complete charging-discharging data curve can be reconstructed by using partial charging data and partial discharging data, to complete subsequent charging-discharging capacity estimation and battery grading. In this case, an intermediate complete charging-discharging cycle is omitted, thereby reducing the time by more than 50% and greatly improving the production efficiency.

Features and advantages of specific embodiments of the present invention are further described in detail below.

1. Performing Preprocessing on Partial Charging-Discharging Measured Data

The partial charging-discharging measured data is set to include K discrete sampling points $\{s_k\}$, where $k = 0, 2, \ldots,$ and $K-1$.

1) Perform an FFT on K pieces of measured data, to transform a time-domain signal to a frequency-domain signal:

$$\{y_l\} = \frac{1}{K} \sum_{k=0}^{K-1} s_k e^{-j\frac{2\pi kl}{K}}, \text{ where}$$

k is a sequence number of a discrete frequency bin.

2) Perform windowing and smooth filtering on the frequency-domain signal, for example, add a raised cosine window:

$$\tilde{y}_k = y_k \cdot H(f), \text{ where}$$

$$H(f) = \begin{cases} T, & 0 \le |f| \le \frac{1-\beta}{2T} \\ \frac{T}{2}\left\{1 + \cos\left[\frac{\pi T}{\beta}\left(|f| - \frac{1-\beta}{2T}\right)\right]\right\}, & \frac{1-\beta}{2T} \le |f| \le \frac{1+\beta}{2T} \\ 0 & |f| > \frac{1+\beta}{2T} \end{cases}$$

is a frequency spectrum of the raised cosine window, $\beta$ is a cutoff frequency, and T is an amplitude.

3) Perform a zero-filling interpolation on the filtered frequency-domain signal to increase a sampling rate, to make it consistent with a sampling rate of reference data:

$$\hat{y}_n = \begin{cases} \tilde{y}_n, & n = 0, 1, \ldots, M-1 \\ 0, & n = M, \ldots, N-1 \end{cases}.$$

4) Transform frequency-domain signal on which the smooth filtering and interpolation have been performed to a time-domain signal:

$$\{\hat{s}(n)\} = \frac{1}{n}\sum_{l=0}^{N-1} \hat{y}_l e^{j\frac{2\pi n}{N}l}.$$

2. Reconstructing Partial Charging-Discharging Cycle Measured Data

Partial charging-discharging measured data needs to be reconstructed based on several preset reference data curves, including a global center reference data curve of this model of lithium battery and a grade center reference data curve of each grade of the lithium battery. Theses reference data curves are closely related to a material and a front-section production process of the lithium battery, and are preset according to the material and process during production. It should be understood by persons skilled in the art that, presetting a charging-discharging reference data curve of a battery according to a material and a process of the battery can be implemented by using common technical means in the art.

2.1. Estimating a Starting Point, Relative to a Reference Data Curve, of Partial Charging-Discharging Measured Data Curve Because of a subtle difference between states of charge when charging and discharging lithium battery are started, first, a starting point, relative to a global center reference data curve, of measured data needs to be determined. In the present invention, a method of searching, in a sliding window, for a minimum difference is provided for measuring a starting point of a measurement curve. The starting point, relative to a reference curve, of a measurement curve is determined by searching, in the sliding window, for a minimum absolute value of a difference between a measured data curve and a global center reference data curve. A specific method is as follows:

Step S1. Obtain, by using a set point on the global center reference data curve as a starting point corresponding to a sampling sequence number w, a segment of data of a set length N, calculate a difference by subtracting measured data from the segment of data, accumulate the differences after the subtraction, and calculate an absolute value of an accumulated value.

Step S2. Compare the absolute value of the accumulated value calculated in step S1 with a minimum difference $e_{min}$ that is initially set to a maximum number, and if the absolute value is less than $e_{min}$, update e_min with the absolute value of the accumulated value calculated in step S1, and record w.

Step S3. Increase w by 1, and if w is greater than a size W of the sliding window, end the process; otherwise, return to step S1.

Description of Parameters:

w: A sampling sequence number of a starting point of a data segment that is used to compare with measured data and that corresponds to the global center reference data curve, initialized to 1.

N: A quantity of sampling points of the measured data.

$\hat{n}(n)$: The $n^{th}$ sampling point of the measured data.

$r_0(n)$: The $n^{th}$ sampling point of the global center reference data curve.

W: A size of a sliding window.

$e_{min}$: Recording a minimum absolute value of a difference between the measured data curve and the global center reference data curve, initialized to a maximum number.

$p_{std}$: Recording a sampling point number of a starting point having a minimum difference on the global center reference data curve, initialized to 0.

Figure 3:
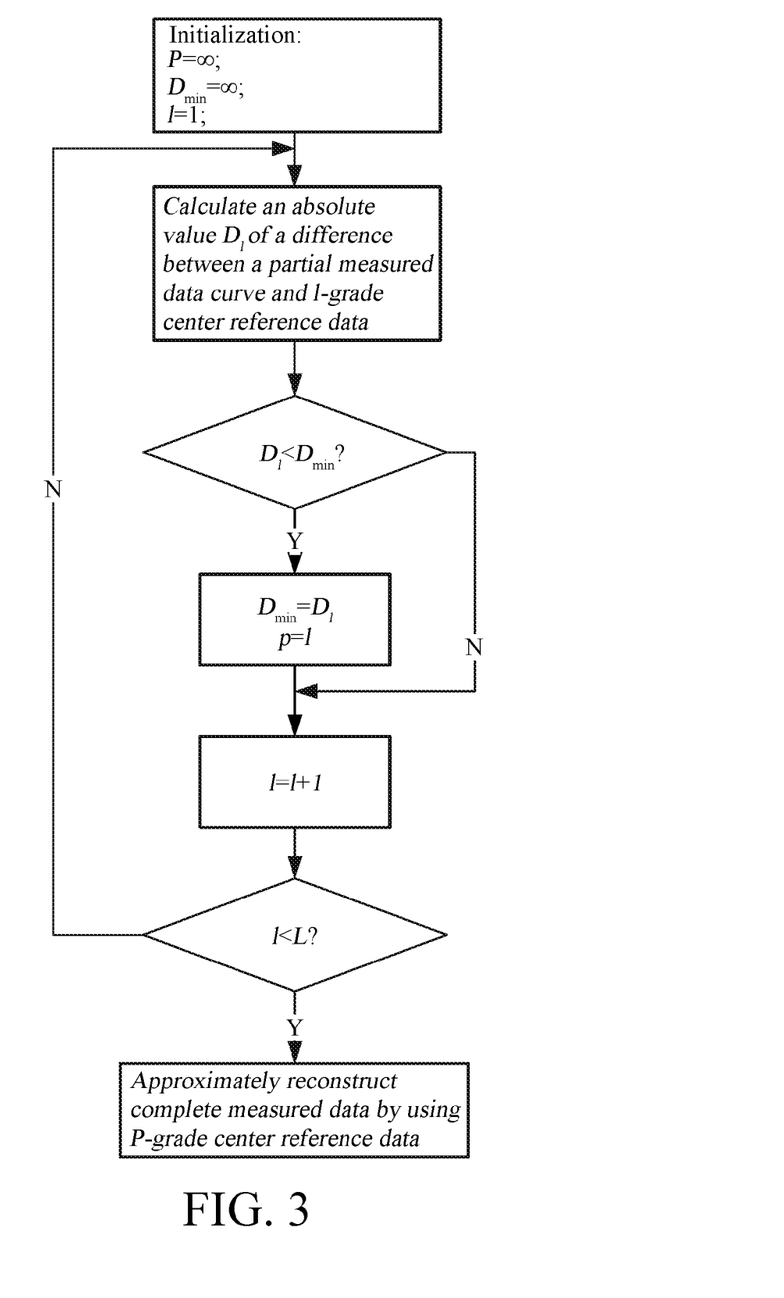
FIG. 3 is a flowchart of linear reconstruction according to an embodiment of the present disclosure.

Pseudocode of an algorithm is as follows:

$e_{min} = \infty$
$p_{std} = 0$
for w = 0:1:W $$\varepsilon = \left|\sum_{n=w}^{N+w-1}(\hat{s}(n-w+1) - r_0(n))\right|$$

if $\varepsilon < e_{min}$
        $e_{min} = \varepsilon$
        $p_{std} = w$
    end
end 2.2. Reconstructing a Complete Measured Data Curve 1) Linear Reconstruction In an embodiment, reconstruction of complete measured data is completed by means of linear reconstruction. Referring to FIG. 3, in linear differential reconstruction, a partial charging-discharging measured data curve is separately matched with each grade center reference data curve, and a grade center reference data curve that has a minimum difference is found as an approximation of measured data, to reconstruct the complete measured data.

Specific steps are as follows:

Step 1. Match the partial charging-discharging measured data curve with each grade center reference data curve separately, and search for a grade center reference data curve having a minimum difference from the partial charging-discharging measured data.

Step 2. Use the selected grade center reference data as an approximation curve, and supplement a remaining part of the measured data curve after translating the approximation curve, to reconstruct the complete measured data curve.

Description of Parameters:

L: Quantity of battery grades.

p: Pointing to grade center reference data having a minimum sum of differences from a partial charging-discharging measured data curve, where p is initialized to a maximum value.

$D_{min}$: Recording a sum of minimum differences between the partial charging-discharging measured data curve and the grade center reference data curve, where $D_{min}$ is initialized to a maximum value.

Pseudocode of an algorithm is as follows:

p=∞
$D_{min}=\infty$
Main body of a cycle:
    for l=1:1:L
        D = $|\Sigma_{n=1}^{N}[\hat{s}(n) - r_l(n + p_{std})]|$
        if D < $D_{min}$
            $D_{min}$=D;
            p=1;
        end
    end The reconstructed complete measured data can be indicated as:

$$\hat{s}_R(m) = \begin{cases} \hat{s}(m), & 0 < m \le N \\ r_p(m+p_{std}) + \hat{s}(N) - r_p(N+p_{std}), & N+1 < m \le M - p_{std} \end{cases},$$

where $\hat{s}_R(m)$ is the $m^{th}$ sampling point of the complete data curve reconstructed by using the linear reconstruction method, $\hat{s}(m)$ is the $m^{th}$ sampling point of the partial charging-discharging measured data, and $r_p(m)$ is the $m^{th}$ sampling point of the grade center reference data having a minimum sum of differences from the partial charging-discharging measured data curve.

2) Least Square Reconstruction

In another embodiment, reconstruction of the complete measured data is completed by means of least square reconstruction. In the least square reconstruction, a measured data curve is reconstructed based on a least square criterion by using existing grade center reference data as a base.

In the least square reconstruction, for the partial charging-discharging measured data obtained by approximating L grade center reference data curves, an optimal coefficient is determined by minimizing a quadratic sum of an approximation error to the partial charging-discharging measured data. After the optimal coefficient is determined, an approximation curve is reconstructed by using the L grade center reference data curves. After translating the approximation curve, a remaining part of the measured data curve is supplemented, to reconstruct the complete measured data curve.

Specific steps are as follows:

Partial charging-discharging measured data including N sampling points is set to be indicated by a vector:

$$\hat{s}_N = [\hat{s}(1) \ldots \hat{s}(N)]^T.$$

M pieces of complete charging-discharging data of a first grade center reference data curve are set to be indicated by a vector:

$$r_1 = [r_1(1) \ldots r_1(N-1) r_1(N) \ldots r_1(M)]^T.$$

An L×M matrix formed by L pieces of grade reference data is indicated as:

$$R_M = \begin{bmatrix} r_1(1) & \ldots & r_1(M) \\ \ldots & \ldots & \ldots \\ r_L(1) & \ldots & r_L(M) \end{bmatrix}.$$

An L×N matrix formed by respectively using $p_{std}$ as a starting point and data of a length of N in the L pieces of grade reference data can be indicated as:

$$R_N = \begin{bmatrix} r_1(p_{std}) & \ldots & r_1(N+p_{std}-1) \\ \ldots & \ldots & \ldots \\ r_L(p_{std}) & \ldots & r_L(N+p_{std}-1) \end{bmatrix}.$$

An undetermined coefficient vector is set to $h=[h(1) \ldots h(L)]^T$, and a mathematical expression of least square approximation is as follows:

$$\min_h \varepsilon_{LS} = \|R_N^T h - \hat{s}_N\|^2;$$

The optimal coefficient h can be solved as:

$$h_{LS} = (R_N R_N^T)^{-1} R_N \hat{s}_N.$$

After the optimal coefficient is determined, the approximation curve reconstructed by using L grade center reference data curves can be indicated as:

$$\hat{s}_{apro} = R_M^T h_{LS}.$$

After translating the approximation curve, a remaining part of the measured data curve is supplemented, to reconstruct the complete measured data curve, and the reconstructed complete measured data can be indicated as $$\hat{s}_{LS}(m) = \begin{cases} \hat{s}(m), & 0 < m \le N \\ \hat{s}_{apro}(m+p_{std}) + \hat{s}(N) - \hat{s}_{apro}(N+p_{std}), & N+1 < m \le M - p_{std} \end{cases},$$

where $\hat{s}_{LS}(m)$ is the $m^{th}$ sampling point of the complete data curve reconstructed by using the least square reconstruction, $\hat{s}(m)$ is the $m^{th}$ sampling point of the partial charging-discharging measured data, and $\hat{s}_{apro}(m)$ is the $m^{th}$ sampling point of the approximation curve constructed by using the least square method.

Figure 4:
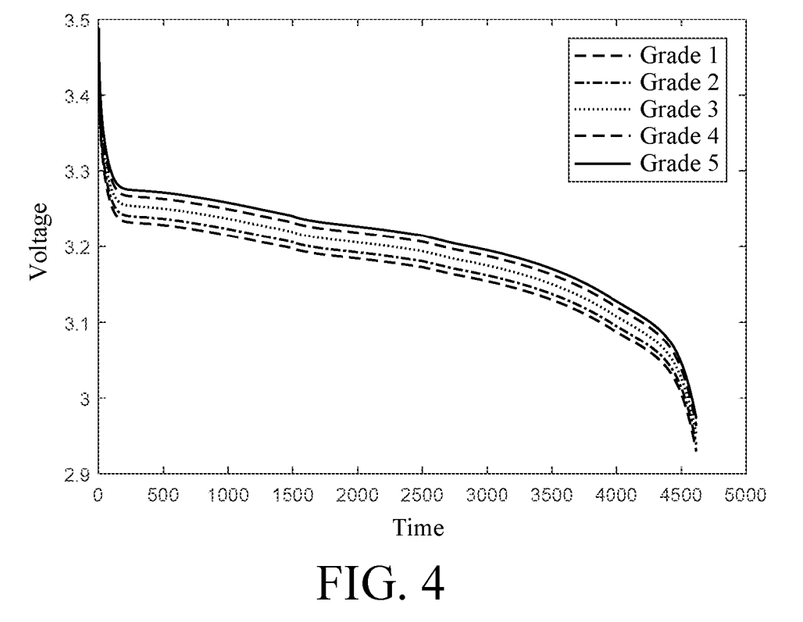
FIG. 4 is a diagram of a grade center reference curve according to an embodiment of the present disclosure.

Test Result 1200 battery samples use lithium battery cells of a same specification. The battery is grouped into 5 grades, and each grade central reference curve is shown in FIG. 4.

The main formation and capacity grading equipment comprises negative pressure formation needle beds and 5V-300A power cabinets. During a specified time, the formation and capacity grading equipment performs constant-current discharging at a current of 60 A and measures a complete constant-current discharging voltage curve. Curve reconstruction is performed according to the method of the present disclosure by using first halves of discharging curves of the 1200 batteries. Reconstruction results are compared with measurement curve results, an estimation error of reconstruction is calculated, and grading is performed by using the reconstructed curve.

It could be learned from the result that, in the reconstruction method of the present disclosure, complete discharging data is precisely reconstructed by using partial discharging data. When a least square reconstruction method with higher complexity is used, a mean square error reaches 5.6E-7 and no battery is incorrectly graded. Compared with an ordinary grading process, the entire grading cycle is shortened by more than 50%, greatly improves production efficiency, and has a high practical value.

TABLE 1

Mean square error and sorting error rate

|  | Mean square error | sorting error rate |
|---|---|---|
| Linear reconstruction method | 1.4E-4 | 0.2% |
| Least square reconstruction method | 5.6E-7 | 0% |

Figure 5:
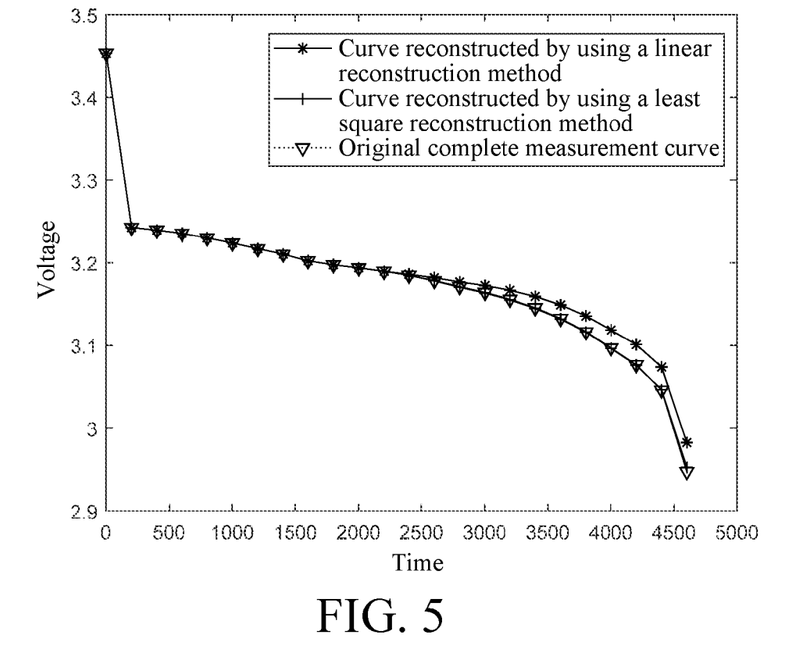
FIG. 5 shows comparison between a complete constant-current discharging curve of a battery and a complete discharging curve reconstructed according to a reconstruction method in the present disclosure by using a partial discharging curve of the battery.
Figure 6:
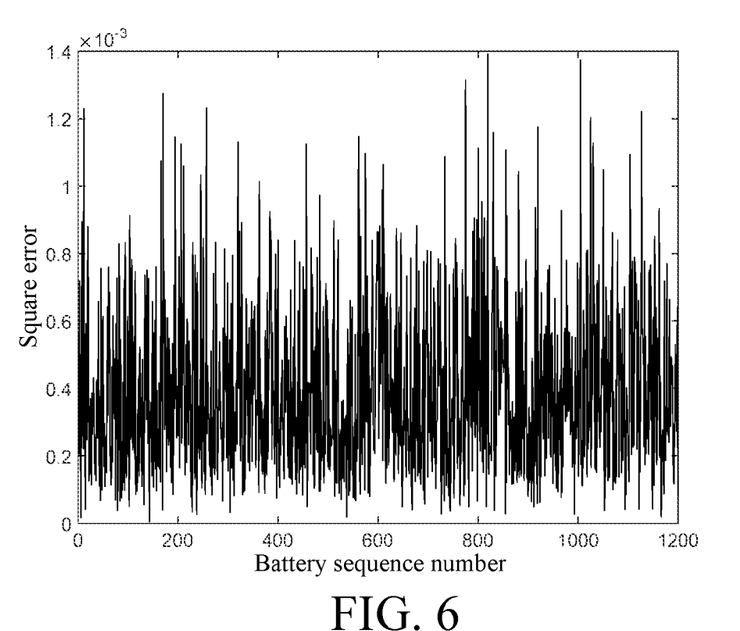
FIG. 6 shows a square error between a complete constant-current discharging curve of a battery and a complete constant-current discharging curve reconstructed according to a linear reconstruction method in the present disclosure by using a partial constant-current discharging curve.
Figure 7:
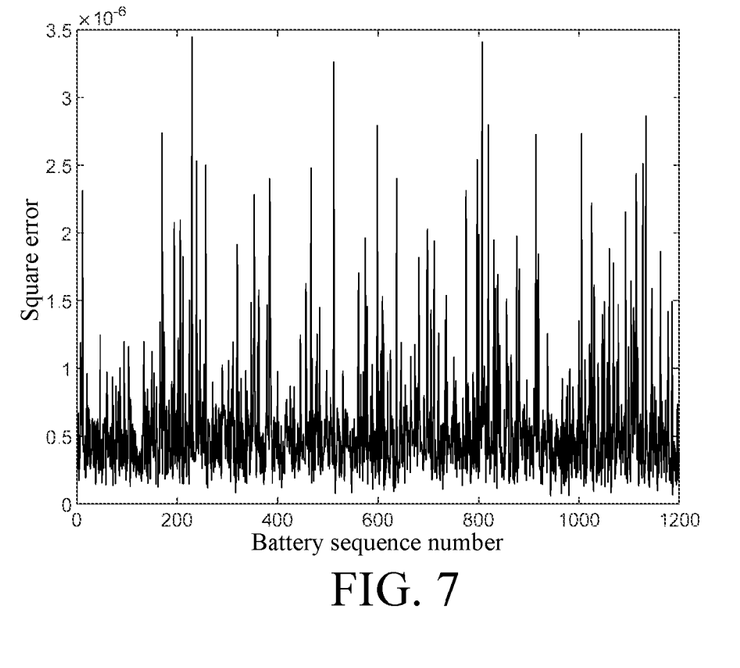
FIG. 7 shows a square error between a complete constant-current discharging curve of a battery and a complete constant-current discharging curve reconstructed according to a least square reconstruction method in the present disclosure by using a partial constant-current discharging curve.

FIG. 5 shows comparison between a complete constant-current discharging curve of a battery and a complete discharging curve reconstructed according to a reconstruction method in the present disclosure by using a partial discharging curve of the battery;

FIG. 6 shows a square error between a complete constant-current discharging curve of a battery and a complete constant-current discharging curve reconstructed according to a linear reconstruction method in the present disclosure by using a partial constant-current discharging curve;

FIG. 7 shows a square error between a complete constant-current discharging curve of a battery and a complete constant-current discharging curve reconstructed according to a least square reconstruction method in the present disclosure by using a partial constant-current discharging curve; and FIG. 8 shows a system according to an embodiment of the present disclosure, where a processor is configured to execute a method for reconstructing complete charging-discharging data based on partial charging-discharging data of a battery by executing an executable instruction stored in a memory.

It should be understood by persons skilled in the art that various illustrative logic blocks, units, circuits, and algorithm steps described with reference to the present disclosure may be implemented as electronic hardware, computer software, or a combination of the two. To clearly describe the interchangeability between the hardware and the software, the foregoing has generally described various illustrative components, blocks, modules, circuits, and steps in terms of functions thereof. Whether the functions are implemented by hardware or software depends on particular applications and design constraints applied to the entire system. Persons skilled in the art may use different methods to implement the functions for each particular application, but it should not be understood that the implementation goes beyond the scope of the present invention. It would also be easily learned by persons skilled in the art that a sequence or combination of components, methods, or interactions is merely exemplary. In the present disclosure, components, methods or interactions in each aspect of the present disclosure may be combined or implemented in a manner different from those manners described in the present disclosure.

Functional blocks and modules may include a processor, an electronic device, a hardware device, an electronic component, a logic circuit, a memory, software code, firmware code, and the like, or any combination thereof. Likewise, a general-purpose processor, a digital signal processor (DSP), an application-specific integrated circuit (ASIC), a field programmable gate array (FPGA), or another programmable logic device, an independent gate or transistor logic, an independent hardware component, or any combination thereof may be used to implement or execute illustrative logic blocks, modules, and circuits described with reference to the present disclosure to execute the functions of the present disclosure. The general-purpose processor may be a micro processor, but alternatively, the processor may be any conventional processor, controller, micro controller, or state machine. The processor may also be implemented as a combination of computing devices, for example, a combination of a DSP and a micro processor, multiple micro processors, one or more micro processors combined with a DSP core, or any other configuration of this type.

Steps of the method or algorithm with reference to the present disclosure may be directly represented by hardware, a software module executed by a processor, or a combination of the two. The software module may reside in a RAM memory, a flash memory, a ROM memory, an EPROM memory, an EEPROM memory, a register, a hard disk, a removable disk, a CO-ROM, or a storage medium in any other known form in the art. A storage medium is connected to the processor, so that the processor can read information from and write information to the storage medium. In an alternative solution, the storage medium may be integrated to the processor. The processor and the storage medium may reside in the ASIC. The ASIC may reside in a user terminal, a base station, a sensor, or any other communications device. In an alternative solution, the processor and the storage medium may reside in a user terminal as independent components.

In one or more exemplary designs, the function may be implemented as hardware, software, firmware, or any combination thereof. If implemented as software, the function may be stored in a computer-readable medium or be transmitted on the computer-readable medium as one or more instructions or code. The computer-readable medium includes a computer storage medium and a communication medium, and includes any medium that helps to transmit a computer program from one place to another place. The computer-readable storage medium may be any available medium that can be accessed by a general-purpose computer or a special-purpose computer. As an example instead of a limitation, the computer-readable medium may include a RAM, a ROM, an EEPROM, a CD-ROM, or another optical disc memory, magnetic disk memory or another magnetic storage device, or any other medium of a device that can be used to carry or store expected program code in a form of an instruction or a data structure. The computer-readable medium may be accessed by a general-purpose or special-purpose computer, or a general-purpose or special-purpose processor. In addition, a connection can properly be referred to as a computer-readable medium. For example, if a coaxial cable, an optical cable, a twisted-pair line, or a digital subscriber line (DSL) is used to transmit software from a website, a server, or another remote source, the coaxial cable, the optical cable, the twisted-pair line, or the DSL is included in the definition of the medium. The magnetic disk and the optical disk used in the present disclosure include a compact disk (CD), a laser disc, an optical disc, a digital video disk (DVD), a soft disk, and a Blu-ray disc, where the magnetic disk generally magnetically reproduces the data, while the optical disc optically reproduces the data by using laser. The above combinations also need to be included with the scope of the computer-readable medium.

Although the embodiments and advantages of the present disclosure have been described in detail, it should be understood that various variations, replacements, or changes may be performed on this disclosure without departing from the spirit and scope of the embodiments defined by the appended claims. Moreover, the scope of the present invention is not limited to the specific embodiments of the process, machine, product, material composition, means, method, and steps described in the specification. It would be easily understood by persons of ordinary skill in the art that, existing or to-be-developed processes, machines, products, material compositions, means, methods and steps that substantially implement the same function or substantially achieve the same result as the corresponding embodiments described herein may be used Therefore, the appended claims are intended to cover such processes, machines, products, material compositions, means, methods or steps.

What is claimed is:

1. A method for testing a battery, comprising the following steps:

A. charging the battery having a partial electrical quantity to a full state of charge, then partially discharging the battery, and obtaining a partial charging-discharging measured data curve, comprising multiple pieces of discrete sampling-point data, of the battery;

B. determining a starting point, relative to a preset global center reference data curve, of the partial charging-discharging measured data curve;

C. determining, by using the partial charging-discharging measured data curve and multiple preset grade center reference data curves, an approximation curve by means of linear reconstruction or least square reconstruction, and supplementing a charging-discharging measured data curve of a remaining part other than the partial charging-discharging measured data curve according to the approximation curve and the starting point, relative to the preset global center reference data curve, of the partial charging-discharging measured data curve, to reconstruct a complete charging-discharging measured data curve; and D. estimating performance of the battery according to the complete charging-discharging measured data curve.

2. The method for testing a battery according to claim 1, wherein the step A comprises performing preprocessing on the partial charging-discharging measured data curve, wherein the preprocessing comprises the following steps:

A1. performing a fast Fourier transform (FFT) on the multiple pieces of discrete sampling-point data, to transform time-domain data to frequency-domain data;

A2. performing windowing and smooth filtering on the frequency-domain data;

A3. performing a zero-filling interpolation on the filtered frequency-domain data to make a sampling rate of the frequency-domain data consistent with a data sampling rate of the global center reference data curve and a data sampling rate of the grade center reference data curve; and A4. transforming the frequency-domain data on which the smooth filtering and the interpolation have been performed to time-domain data.

3. The method for testing a battery according to claim 1, wherein in the step B, the starting point, relative to the global center reference data curve, of the partial charging-discharging measured data curve is determined by searching, in a preset sliding window, for a minimum absolute value of a difference between the partial charging-discharging measured data curve and the global center reference data curve.

4. The method for testing a battery according to claim 3, wherein the step B comprises:

B1. obtaining a segment of data of a set length by using a set point on the global center reference data curve as a starting point corresponding to a sampling sequence number w, calculating a difference by subtracting corresponding measured data on the partial charging-discharging measured data curve from the segment of data, accumulating the differences after the subtraction, and calculating an absolute value of an accumulated value, wherein w is initialized to 1;

B2. comparing the absolute value of the accumulated value calculated in the step B1 with a minimum difference e_min that is initially set to a maximum number, and if the absolute value is less than e_min, updating e_min with the absolute value of the accumulated value calculated in the step B1; and B3. updating the starting point, increasing w by 1, and if w is greater than a size of the sliding window, ending the process; otherwise, returning to the step B1.

5. The method for testing a battery according to claim 1, wherein the step C comprises the following steps:

C11. matching the partial charging-discharging measured data curve with each of the multiple grade center reference data curves separately, to determine a grade center reference data curve having a minimum difference from the partial charging-discharging measured data curve; and C12. using the grade center reference data curve determined in the step C11 as the approximation curve, and supplementing the charging-discharging measured data curve of the remaining part after translating the approximation curve according to the starting point, to reconstruct the complete charging-discharging measured data curve.

6. The method for testing a battery according to claim 1, wherein the step C comprises the following steps:

C21. approximating the partial charging-discharging measured data curve by using the multiple grade center reference data curves, to determine an optimal coefficient that minimizes a quadratic sum of an approximate error; and C22. constructing the approximation curve by using the multiple grade center reference data curves according to the optimal coefficient, and supplementing the charging-discharging measured data curve of the remaining part after translating the approximation curve, to reconstruct the complete charging-discharging measured data curve.

7. The method for testing a battery according to claim 6, wherein in the step C21, the multiple grade center reference data curves are set to be L curves, and each grade center reference data curve is set to have N pieces of discrete sampling-point data;

partial charging-discharging measured data comprising the N pieces of discrete sampling-point data is indicated by a vector:

$$\hat{s}_N = [\hat{s}(1) \ldots \hat{s}(N)]^T;$$

M pieces of complete charging-discharging data of a first grade center reference data curve are indicated by a vector:

$$r_1 = [r_1(1) \ldots r_1(N-1) r_1(N) \ldots r_1(M)]^T;$$

an L×M matrix formed by L pieces of grade reference data is:

$$R_M = \begin{bmatrix} r_1(1) & \ldots & r_1(M) \\ \ldots & \ldots & \ldots \\ r_L(1) & \ldots & r_L(M) \end{bmatrix};$$

an L×N matrix formed by respectively using $p_{std}$ as a starting point and data of a length of N in the L pieces of grade reference data is:

$$R_N = \begin{bmatrix} r_1(p_{std}) & \ldots & r_1(N + p_{std} - 1) \\ \ldots & \ldots & \ldots \\ r_L(p_{std}) & \ldots & r_L(N + p_{std} - 1) \end{bmatrix};$$

an undetermined coefficient vector is set to $h=[h(1) \ldots h(L)]^T$, and least square approximation is performed by using the following formula:

$$\min_h \varepsilon_{LS} = \|R_N^T h - \hat{s}_N\|^2;$$

the optimal coefficient h is solved as:

$$h_{LS}=(R_N R_N^T)^{-1} R_N \hat{s}_N;$$

after the optimal coefficient is determined, the approximation curve reconstructed by using L grade center reference data curves is:

$$\hat{s}_{apro}=R_M^T h_{LS}.$$

8. The method for testing a battery according to claim 1, wherein the global center reference data curve and the multiple grade center reference data curves are preset according to a material and a production process of the battery.

9. The method for testing a battery according to claim 1, wherein the battery is a lithium battery.

* * * * *